United States Patent Office 3,505,249
Patented Apr. 7, 1970

3,505,249
FABRICATING EXPANDABLE THERMOPLASTIC RESINOUS MATERIAL
Richard E. Skochdopole and Louis C. Rubens, Midland, Mich., assignors to The Dow Chemical Company, Midland, Mich., a corporation of Delaware
No Drawing. Filed Nov. 16, 1964, Ser. No. 411,609
Int. Cl. C08f 47/10
U.S. Cl. 260—2.5                         7 Claims

ABSTRACT OF THE DISCLOSURE

Room temperature expanding plastic particles or beads are prepared by foaming to a low density under vacuum, subsequently partially collapsing under atmospheric pressure at a temperature below the softening point of the bead or particle. Such particles can be stored for long periods of time and re-expand in air when without mechanical restraint.

---

The present invention resides in the general field of plastic fabrication and, in particular, contributes to the art of forming expandable thermoplastic resinous materials into various desired molded shapes, structures, and filling of cavities. More particularly, it relates to a new and improved method of preparing and molding expandable, partly expanded or pre-foamed thermoplastic resinous materials.

Pursuant to known procedures, a variety of thermoplastic polymeric and resinous materials may be expanded from a granular or bead form to assume a porous, cellular, solidified foam-like structure by the action of various propellants or agents for expanding or blowing the materials. The blowing agents, in accordance with common practice, are usually gases (or gas generating substances) or highly fugacious liquids which have been dissolved or otherwise intimately incorporated within the thermoplastic resinous material while it is in an unexpanded granular form. The application of heat to an unfoamed granular thermoplastic resinous material containing a blowing agent causes the blowing agent to be released or thermally expanded, or both, while the thermoplastic or moldable particulate material is attaining a foaming temperature at which it is sufficiently softened and yieldable to permit the pressure of the thermally expanding blowing agent to expand it into the desired foam structure.

The heat energy which is required to soften the resinous material and release the blowing agent for the foam forming function is conventionally derived from an externally generated source. Thus, steam, hot air and other heat supplying means are ordinarily employed for the purpose of foaming the thermoplastic material.

Although most of the expandable particulate thermoplastic resinous material is utilized in molding applications wherein a unitary body is produced from a particulate mass, there are many applications, particularly those in the insulation field, wherein a unitary body is not required. For example, in a household refrigerator door which is formed from thermoplastic resinous sheet, there is a cavity which is filled with an insulating material. A loose fill or pour type insulation such as expanded mica, foam particles, and the like, is generally undesirable because under extended use, movement of the particles causes attrition and compaction, and therefore reduced insulating value is achieved. Desirably, an insulating material should entirely fill the cavity in which it is disposed and be incapable of movement under normal use stresses.

An object of this invention is to provide an improved partially expanded thermoplastic resinous article.

A further object of this invention is to provide an improved method of filling cavities with an insulating material.

A further object of this invention is a method which is a means of providing a low density, that is below about one pound per cubic foot, foamed thermoplastic resinous material.

These benefits and other advantages in accordance with the present invention are achieved by providing a mass consisting essentially of expandable cellular thermoplastic polymer particles composed substantially of partially collapsed individualy closed cells containing a volatile fluid foaming agent which is non-solvent for the polymer, the volatile fluid having a permeability rate through the cell walls that is appreciably less than the permeability of atmospheric gases through the collapsed walls.

Also contemplated within the scope of the present invention is a method of filling cavities which comprises adding to such cavity a quantity of the hereinbefore described particles and maintaining the particles in an atmosphere which has a permeability rate through the polymer sufficiently greater than the permeability rate of the volatile foaming agent that the particles expand.

Another portion of the invention is a method for the preparation of foamed synthetic thermoplastic resinous bodies composed substantially of partially collapsed individually closed cells comprising heating a thermoplastic polymer particle containing a volatile expanding agent to a temperature sufficiently high to soften the polymer and cause it to form a cellular product under a pressure of from about 0.001 to about 10 pounds per square inch absolute, lowering the temperature of the expanded thermoplastic body to a temperature below its softening point and subsequently increasing the pressure thereon to ambient atmospheric pressure and collapsing the body to occupy a volume beneficially less than about 70 percent of the maximum volume attained during expansion while retaining within the individual closed cells a portion of the volatile expanding agent.

Any thermoplastic resinous material which can be expanded or foamed as a result of or by the application of heat thereto may advantageously be fabricated according to the method of the present invention. Merely for purposes of convenient illustration, however, without intending to be restricted thereto, the invention will be predominantly described in connection with expandable granules or particles of styrene polymers, such as polystyrene. These may be in an essentially linear or in a crosslinked form. Such resins are generally realistically representative of expandable thermoplastic resinous materials. They are especially representative of thermoplastic resinous alkenyl aromatic compounds which contain at least about 50 weight percent of at least one alkenyl aromatic compound having the general formula:

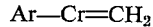

$$Ar-Cr=CH_2$$

wherein Ar is an aromatic radical (advantageously one containing from 6 to about 14 carbon atoms, including the carbon atoms in various substituents, such as alkyl groups on the aromatic nucleus) and R is selected from the group consisting of hydrogen and methyl, any balance being another ethylenically unsaturated monomeric material polymerizable with said alkenyl aromatic compound to provide thermoplastic resinous products (such as acrylonitrile, methyl methacrylate, etc.).

Expandable thermoplastic moldable polymers and copolymers (including graft copolymer products) of ar-methyl styrene or vinyl toluene, the several chloro styrenes (such as mono- and dichloro styrene), ar-dimethyl styrene, ar-ethyl styrene and the like, including the various thermoplastic moldable polymers and copolymers of alphamethyl styrene, may frequently be utilized with benefits commensurate to those which are derivable from employment of polystyrene. Often, this may also be the case when other expandable thermoplastic resinous materials well known to the art are employed, including those which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, expandable thermoplastic olefin polymers and copolymers, particularly those from non-aromatic hydrocarbon olefins, such as polyethylene, polypropylene, copolymers of ethylene and propylene and the like; chlorinated polyolefins such as chlorinated polyethylene, etc., and the like.

The blowing agents employed for the expandable thermoplastic resinous material may be any of those which are commercially utilized for such purposes, including such fugacious materials as dichlorodifluoromethane, monochlorotrifluoromethane, isopentane, pentane and other low boiling hydrocarbons, and may be used in conjunction with other suitable materials such as heat-sensitive gas generating agents (liquid or solid) including those which, upon thermal decomposition, generate nitrogen, carbon dioxide, etc. and the like. As is apparent, the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 3 and 15 weight percent or so of such fugacious materials as dichlorodifluoromethane, neopentane or pentane may be employed. The fugaceous or gaseous blowing agents may be incorporated into the thermoplastic material by any technique suitable for the purpose; including such known procedures as pressing a volatile or gaseous blowing agent under appropriate conditions of temperature and pressure into an already prepared thermoplastic material desired to be rendered expendable or, alternatively, by including certain of such agents in the polymerization mass in which the thermoplastic polymer is prepared so as to thereby incorporate efficient amounts of the blowing agent in the polymer and directly provide an expandable product. Similar or even greater amounts (as, for example, up to 15–20 or so percent) of such solid blowing agents as $\alpha,\alpha'$-azobisizobutyronitrile or p,p'-oxy-bis benzene sulfonyl hydrazide (which generate nitrogen) and sodium carbonate (which generates carbon dioxide) are generally employed. Lesser quantities of the chemical blowing agents are required when employed in combination with a fugacious agent.

Particularly advantageous and beneficial in the practice of the present invention are the combinations of polymers and copolymers of ortho and parachlorostyrene and the various dichloro and trichloro styrenes with up to 20 percent of another olefinically unsaturated monomer and containing uniformly dispersed through a fugacious liquid blowing agent such as isopentane. The partially collapsed particles employed in the present invention are readily prepared by heating the particle to a temperature sufficiently high to cause softening thereof, but not sufficiently high to permit the major portion of the blowing agent to escape from the particle, foaming the particle to a density of about 1 pound per cubic foot, and beneficially to a bulk density of from about 0.3 to 0.75 pounds per cubic foot, thereafter cooling the particle to cause contraction of the blowing agent and collapse of the cells. This is accomplished by heating of the particle under substantially less than atmospheric pressure and cooling the particle sufficiently rapidly that a significant portion of the blowing agent does not diffuse therefrom. In this manner, particle densities significantly less than ½ pound per cubic foot are readily obtained at pressure ranging from at least about 0.001 to about 10 pounds per square inch absolute and beneficially at pressures of from about 0.05 pounds per square inch to about 1 pound per square inch absolute. As is readily understood the lower the pressure employed for the expansion, the lower the density of the resultant body will be. The pressure required will depend to some extent upon the quantity of the blowing agent present in the polymer. Thus, if relatively large quantities of blowing agent are contained within the unexpanded polymer higher absolute pressures may be employed. Generally, for most practical purposes, lower density particles at lower cost are obtained when lower amounts of the blowing agent are employed and lower pressures utilized. In the blowing operation the bodies or particles must be expanded to a degree sufficient to cause the walls of the individual cells to be sufficiently thin and weak that on returning at atmospheric pressure such walls will collapse. This is achieved by foaming the particle to a density at which the compressive strength is less than atmospheric. If during the treatment under reduced pressure and at a temperature equal to or greater than the softening temperature of the polymer composition the particles are maintained for an undue period of time, the blowing agent will diffuse from the polymer and upon cooling will collapse under atmospheric pressure, the bodies will achieve a stable state which will not expand upon exposure to atmospheric conditions. This stable collapsed state is achieved because diffusion of atmospheric gases into the foam cells can never build up super-atmospheric pressures to cause expansion. This is in the case when no portion of a volatile blowing agent remains in the cells. The quantity of volatile blowing agent remaining in the cells is not critical, within practical limits, but need only be sufficient to cause the volume of external atmosphere passing through the cell wall to be greater than the volume of atmosphere leaving the cell through the cell wall. Such quantities for various polymers are readily calculated from known gas diffusion rates. In order to achieve a useable product of commercial significance, it is desirable that the body or particle be collapsed to a volume of about 70 percent of the maximum volume that the body achieves when foamed under reduced pressure and that it expand at least about 40 percent of the collapsed volume on exposure to air or like atmosphere. Such volume allows complete filling of the void spaces between tightly packed spherical particles on re-expansion. The resultant collapsed particle is then readily re-expanded by exposure to a permeable atmosphere such as air. The particles are readily prepared by foaming to a low density, collapsing the particles or body to a higher density by exposure to atmospheric pressure at temperatures from about 5–35° centigrade, packaging of the particles in a container which provides an atmosphere which does not diffuse into the particle at a rate significantly different than the diffusion rate of blowing or expanding agent out of the polymer. Beneficially this is most readily accomplished by foaming the material to the desired low density, collapsing it, and immediately sealing in a substantially air tight container. For example, if the collapsed particles are in the form of beads or other similar small configurations, they are readily packaged in a substantially air tight container having a volume approaching the collapsed volume of the beads. Such a container can be a bag fabricated from a material having low nitrogen-oxygen permeability rate such as are obtained when vinylidene chloride copolymers are used, or metal foil laminates. Such a container of particles is remarkably stable. When the bag is filled and sealed the particles appear as loose granules. On storage or standing the air within the bag diffuses into the polymer particles and the bag is tightly filled. As air diffuses through the low permeability package and into the beads an equilibruim is reached and the particles do not expand further, but are restrained by the bag. Such a container may be retained for long periods of time and then opened when the particles are to be used. Such collapsed particles have a relatively high density when compared to the density of the expanded particle, and significant savings in shipping costs as well as saving in warehouse space results. The particles or shaped article may be removed from such a bag and exposed to air or other gases which permeates the cell walls at a rate faster than the blowing agent, and they expand to generally the original foamed up volume.

The particles of the present invention solve a difficult problem in the field of insulation and filling of cavities and are found useful in other areas such as packaging of a rocket and complex parts. Generally the maximum pressure exerted by the particles while expanding is in the order of 1 pound per square inch. Thus, relatively delicate and fragile structures may be placed in a container with the expandable particles and the particles slowly expand and support the article in a relatively uniform manner and maintain it in spaced relationship from the sides of the container. Articles which beneficially are packaged employing this technique include electrical instruments such as meters, tubes or valves, electronic assemblies, and the like. Glass articles both of the decorative and utilitarian variety, as well as mechanical movements which are subject to damage, benefit from such packaging. As the particles expand without adhering together or to the article being packaged, upon opening one of the containers the expanded foam particles are readily removed and the packaged article extracted therefrom. Generally with most surfaces which are not adhesive and do not chemically attack the thermoplastic resinous particles, no tendency for adhesion is observed and the article can be removed and is substantially contaminate-free, thus eliminating the need for an overwrap which is often employed with conventional packing material and even with molded plastic foam packages.

Beneficially, particles of the present invention may be utilized using the techniques generally similar to those disclosed in U.S. Patent 2,959,508, wherein an adhesive or a bonding material is employed on the surface thereof. Thus a suitable curing adhesive is employed to cover the surface of the individual particles or selected portions of the individual particles, with an adhesive which will set or harden in a time greater than the time required for the particles to expand or alternately with a pressure sensitive adhesive which will cause adjacent particles to adhere together or adhere to adjacent surfaces as they expand and contact those surfaces. The types of such adhesives which may be used are varied. The only critical requirement is that they do not chemically attack the polymer to an extent that a significant portion of the cell structure is destroyed and that they do not prevent the permeation of air or other gas into the expendable particle. Generally, extremely small quantities of adhesives may be employed, as the physical strength of the low density foams is small. The strength of the adhesive bond need only be sufficient to cause failure of the cellular structure to obtain maximum physical properties. Oftentimes for many purposes an adhesive bond which provides substantially less than maximum physical properties is emminently suitable. For example, in a packaging application wherein the container may be subjected to rapidly varying conditions of temperature and pressure, a wide variety of adhesive materials may be utilized according to the desired end use. Thermosetting phenolic resins and epoxy resins benefiically may be employed wherein the partially expanded particles are coated with the resin, poured into a cavity, expanded, and the adhesive cured. The cure rate on an adhesive of this nature must, of course, be such that the particles may expand to the desired degree prior to setting of the adhesive to a completely thermoset condition unless only selected portions of the particles are treated with the adhesive and expansion thereof is not significantly inhibited. Beneficially in certain instances wherein rapid re-expansion is desired of the particles, they may be essentially impregnated with a gas at relatively low temperatures or under pressure, and on warming above the gas temperature of the polymer, re-expand more rapidly than if allowed to stand in an atmosphere under normal conditions or usual ambient conditions. For example, materials of the present invention can be expanded rapidly if they are stored at low temperatures in the presence of a permeable gas. For example, if the partially collapsed particles are stored at a temperature of about $-80°$ centigrade in the presence of air for a period of time sufficient to permit diffusion of air into the particle, relatively rapid expansion is obtained when the particles are warmed to room temperature. Advantageously, if a rapid treatment is desired the particles can be contacted with liquid nitrogen or liquid air, stored in the presence of solid carbon dioxide, and like materials which are gaseous at room temperature and do not exhibit a destructive solvent effect on the cellular plastic system. The invention is further illustrated, but not limited, by the following examples.

EXAMPLE 1

Expandable polymer beads having a diameter of 1–2 millimeters are prepared by aqueous suspension polymerization of a mixture containing 84.9 weight percent of orthochlorostyrene, 0.1 weight percent of a 1:1 mixture of ethylvinylbenzene and divinylbenzene and 14.6 weight percent of isopentane and 0.4 weight percent benzoyl peroxide. This mixture constituted the polymerization oil phase and 80 parts by weight thereof was dispersed in 100 parts by weight of a solution of 0.046 weight percent sulphonated polyvinyltoluene, 0.10 weight percent potassium dichromate in deionized water, and the pH of the solution was adjusted to about 6 by the addition of sodium hydroxide. Polymerization was carried out at a temperature of 70 percent for about 72 hours. The polymer beads, on analysis, are found to contain about 12 weight percent isopentane. The separated beads were heated in an air oven which was in communication with a vacuum line which optionally could be employed to reduce the pressure within the air oven during the foaming operation. Four samples were utilized and the following observations on the foaming behavior of the beads in the oven were made and are set forth in the following table.

TABLE I.—FOAMING BEHAVIOR OF EXP-OCS #1

| Sample Number | Oven temp., °C. | Atmosphere | External pressure (p.s.i.)[1] | Elapsed time (min.) | $V_F/V_S$ |
|---|---|---|---|---|---|
| 1 | 138 | Air | 14.6 | 2.8 | 37.6 |
| 1a | 138 | Air | 14.6 | 10 | 42 |
| 2 | 138 | Air | 0.075 | 2.8 | 148 |
| 3 | 138 | Air | 0.075 | 2.8 | 142 |

[1] Absolute pressure within the oven during foaming.
[2] $V_F$ equals volume of the foam. $V_S$ is the volume of the unfoamed particle.

After foaming, the samples were cooled to about 20° centigrade. The samples 1 and 1a, the ratio of $V_F$ to $V_S$, remained substantially constant. The sample designated as 2 was warmed to about 138° centigrade and after foaming for 5 minutes while maintaining the external pressure at about 0.075 pounds per square inch absolute, the $V_F/V_S$ remained substantially constant and had a value of 148. The sample was cooled to about 20° centigrade and the pressure was subsequently increased to atmospheric, that is, about 14.6 pounds per square inch. The foam collapsed to a $V_F/V_S$ value of 38. The surface of the foam had a wrinkled appearance. The collapsed particle was maintained in air at atmospheric pressure at a temperature of about 20–23° centigrade and the foam volume was observed with time. Results are set forth in the following table.

TABLE II

| Elapsed time (hours) | $V_F/V_S$ | Appearance |
| --- | --- | --- |
| .1 | 38 | Wrinkled surface. |
| 18 | 74.6 | Less wrinkled. |
| 72 | 91.0 | Do. |
| 168 | 125.0 | Smooth surface. |

Sample 3 was exposed to atmospheric pressures before cooling, that is, after being foamed 5 minutes at 138° centigrade under a pressure of 0.075 pounds per square inch. The foam volume $V_F/V_S$ decreased from 142 to about 34. The particle was then cooled to about 20° centigrade. No significant change in the foam volume was observed. After a period of one week under atmospheric pressure and at temperatures from about 20–23° centigrade, still no change in volume was observed. The surface of the particle was smooth and unwrinkled.

When the bead treated under the conditions of sample 2 was placed in liquid nitrogen for a period of 5 minutes and subsequently warmed to room temperatures, a foam volume of 142 is obtained after a period of about 1 minute.

EXAMPLE 2

In a manner similar to Example 1, beads of a copolymer of 93 weight percent styrene and 7 weight percent acrylonitrile containing 8.4 weight percent of a mixture of 25 weight percent n-pentane and 75 weight percent 2,3-dimethylbutane were prepared. The resultant particles expand to a foam volume of $V_F/V_S$ of about 120 at a temperature of 135° centigrade under a pressure of 0.75 pounds per square inch absolute in about 3 minutes. The particle was cooled to a temperature of about 20° centigrade and the pressure subsequently increased to about 14.6 pounds per square inch absolute. The foam collapsed to a foam volume of about 9. After standing for about 3 days at a temperature of from about 20–23° centigrade in air at atmospheric pressure the foam volume increased to about 25.

EXAMPLE 3

In a manner similar to Example 1 a plurality of expandable thermoplastic resinous beads were prepared. The beads are 93.4 percent by weight of a copolymer of 93 weight percent styrene and 7 weight percent acrylonitrile. The beads contained 7.6 weight percent n-butane. The particle was then foamed, collapsed, utilizing the procedure generally of the previous example and the following observations were made.

TABLE III

| Time elapsed (seconds) | Oven temp. (° C.) | Oven pressure (mm. Hg) | Particle diameter (mm.) | $V_F/V_S$ | Comments |
| --- | --- | --- | --- | --- | --- |
| 0 | 25 | 760 | 0.9 | 1 | Initial expandable bead. |
| 60 | 115 | 760 | 2.6 | 24 | Foam, smooth surface. |
| 120 | 115 | 3 | 4.8 | 151 | Pressure reduced. |
| 160 | 25 | 3 | 5.1 | 182 | Cooling started. |
| 200 | 25 | 3 | 5.4 | 216 | |
| 250 | 25 | 3 | 5.4 | 216 | |
| 300 | 25 | 760 | 2.4 | 19 | Pressure increased. Wrinkled foam surface |

After 300 seconds the partially collapsed wrinkled foam particle was removed from the oven and immediately immersed in liquid nitrogen. The bead remained in the liquid nitrogen for a period of about 5 minutes. The particle was then removed from the liquid nitrogen and warmed to a temperature of about 20° centigrade and the foam expanded to a foam volume $V_F/V_S$ of 190. When a like particle was subjected to the same conditions with the omission of the liquid nitrogen treatment after a period of 24 hours, a foam volume of 29 was obtained.

EXAMPLE 4

Expandable particles were prepared substantially in a manner of Example 1 wherein various beads had the following compositions: 92 weight percent polystyrene, 8 weight percent neopentane, 93 weight percent of a copolymer containing 93 weight percent styrene and 7 weight percent acrylonitrile and 7 weight percent neopentane, 94 weight percent polyorthochlorostyrene and 6 weight percent of a 1:1 mixture of isopentane and 2,3-dimethylpentane. Particles of each of these compositions were subjected to treatment by heating under vacuum, cooling and subsequently collapsing of the particle in the hereinbefore described manner. The particles were then placed in liquid nitrogen for a period of about 5 minutes and subsequently warmed to room temperature. The results are set forth in the following table.

TABLE IV

| Material | $V_E/V_S$ (prior to partial collapse) | $V_F/V_S$ (partial collapsed volume) | $V_F/V_S$ (volume after re-expansion) |
| --- | --- | --- | --- |
| Polystyrene foam | 260 | 89 | 250 |
| 93% styrene, 7% acrylonitrile copolymer foam | 216 | 19 | 190 |
| Poly-o-chlorostyrene foam | 148 | 38 | 140 |

The values listed are simply indicative of foam volumes which can be achieved by this process and they should not be considered limiting.

EXAMPLE 5

Particles were prepared in accordance with the procedure of Example 1 having an unexpanded diameter of about 2 millimeters. These beads were subsequently expanded to a diameter of about 13–14 millimeters in an air oven under a pressure of about 0.075 pounds per square inch at a temperature of 138° centigrade over a period of about 2 hours. The foam volume $V_F/V_S$ was 300. The resultant foam particles had a uniform fine closed cell structure. The cell size was less than $\frac{1}{10}$ of a millimeter. The particles were cooled to about 20° centigrade and subjected to a pressure of about 14.6 pounds per square inch absolute (causing a collapse of the beads to a $V_F/V_S$ of 35). A portion of these collapsed beads was transferred to liquid nitrogen for a period of about 5 minutes, subsequently warmed to a temperature of about 20° centigrade. The foam volume increased on warming from a value of about 35 to about 300. A portion of the collapsed beads was coated with a polyurethane composition which consisted of (a) 10 parts of a polypropylene oxide having a molecular weight of about 2000 and terminating in a hydroxyl group at each end of the molecule; (b) 11.7 parts of the reaction product of 20 parts by weight of the polypropylene oxide and 3.48 parts of metatoluene diisocyanate; and (c) 0.075 gram of triethylene diamine. Equal parts of partially collapsed foam particles and the urethane mixture were mixed in liquid nitrogen. The cooled foam-adhesive mixture was subsequently confined in a mold and warmed to room temperature. The foam particles re-expanded and completely filled the mold. The individual particles distorted to fill the interstitial space between particles and form a void-free foam mass. After 20 minutes at room temperature the mold was opened and the foam removed. The foam retained the shape of the interior of the mold and the interparticle bond was sufficiently strong that individual foam particles could not be separated from the foam mass without tearing the foam.

EXAMPLE 6

The procedure of the foregoing experiment was repeated with the exception that 15 weight percent of trichlorofluoromethane based on the weight of the urethane mixture was added to the urethane mixture prior to cooling. Similar beneficial results were achieved and when foamed in a mold which permitted unconfined expansion, a greater volume of foam was obtained.

EXAMPLE 7

Two grams of the polyurethane mixture employed in Examples 5 and 6 were utilized to coat the interior surface of a 120 milliliter glass bottle with a coating about 0.005 inch in thickness. One gram of the liquid nitrogen-treated partially collapsed foam particle prepared in Example 6 was introduced to the coated bottle. After about 7 minutes, re-expansion of the partially collapsed foam occurred and portions of the liquid resin were forced into the interstitial spaces. After 20 minutes the bottle was broken, and the polyurethane material had formed a thin coherent layer on the surface which was found to be smooth and uniform with no indication of surface defects.

EXAMPLE 8

Sixteen parts by weight of regular polyethylene of the high pressure variety having a melt index of 2 was placed in a pressure vessel with about 10 parts by weight of difluorodichloromethane. The vessel was sealed and the contents and vessel were heated to a temperature of about 120° centigrade for a period of 2 hours.

After the heating, the contents of the vessel was liquid and was cast directly from the pressure vessel in a layer onto a polished chromium plated surface. The contents instantaneously expanded to a foam having a volume of 55 times the volume of the polymer. The foam sheet, on standing at room temperature (about 25° centigrade), for a day shrunk to a volume of only 38 times the volume of the original polymer. After several days at room temperature in air the foam sheet re-expanded to slightly greater than 55 times the original volume of the polymer.

EXAMPLE 9

A copolymer prepared from 80 weight percent ethylene and 20 weight percent ethyl acrylate having a melt index of 2 was admixed with 24 weight percent of dichlorotetrafluoroethane based on the weight of the copolymer and treated in the manner of Example 8 to form a foam having a volume 43 times the original volume of the copolymer on standing for 3 hours at about 20° centigrade in an atmosphere of air at normal temperature. The foam collapsed to a volume 24 times that of the original polymer and had a wrinkled appearance. After standing 30 days at ambient temperatures, the foam expanded to the original volume of 43 times the volume of the original copolymer.

EXAMPLE 10

Expandable polyorthochlorostyrene beads were prepared by suspension polymerization of 91.38 weight percent orthochlorostyrene, 0.12 weight percent of a 1:1 mixture of divinylbenzene and ethylvinylbenzene, 8 weight percent isopentane and ½ percent benzoyl peroxide. The polymer beads were about 1.6 millimeters in diameter. A portion of the beads were heated in an air oven to a temperature of 135° centigrade in an air oven for a period of 6 hours. At the end of 6 hours the beads were about 10.7 millimeters in diameter representing an increase in volume of the particle of about 300. The expanded beads were subjected to a pressure of about 1 millimeter of mercury absolute at 23° centigrade for a period of about 17 hours. No change in volume was observed. The beads were then subjected to normal atmospheric pressure and the volume of the foamed particles decreased to about $1/10$ of the fully expanded volume. The diameter of the particles was about 4.9 millimeters. A sufficient quantity of the collapsed particles was placed in a glass vessel to occupy about ½ of the internal volume of the vessel. After 24 hours in contact with air at room temperature, the collapsed foam particles had re-expanded sufficiently to fill the bottle. However, small interstitial spaces still existed.

EXAMPLE 11

Methyl methacrylate monomer containing 20 weight percent fluorotrichloromethane based on the methyl methacrylate was irradiated with gamma radiation from a Cobalt 60 source at a rate of about $10^5$ rads per hour until a total dosage of 1.6 megarads was obtained. A solid polymethyl methacrylate body containing fluorotrichloromethane was obtained. A portion of this polymer was placed in an oven and maintained at a temperature of 140° centigrade under a pressure of 1 millimeter of mercury absolute for 15 minutes. At the end of this period a polymer formed a foam having a volume of 100 times its unexpanded volume. The temperature of the oven was reduced to about 20° centigrade under a pressure of about 1 millimeter. The pressure was then increased to ambient atmospheric pressure, whereupon the foam collapsed to a volume of about 40 times the unexpanded volume. After an exposure to air under ambient conditions, the collapsed foam re-expanded to 100 times the unexpanded volume.

EXAMPLE 12

Granules of a copolymer of 72 percent by weight styrene and 28 percent by weight acrylonitrile was treated with a mixture containing 60 weight percent neopentane and 40 weight percent Freon II. The resultant particles contained 10.4 weight percent of the blowing agent mixture. Portions of the particles were foamed in a densiometer at a temperature of about 100° centigrade for a period of 7 minutes. After 7 minutes the foam volume $V_F/V_S$ was 150. On cooling to about 20° centigrade, the foam volume was 30. The collapsed sample was placed in an air convection oven having a temperature of 50° centigrade. After 5 hours, the foam volume increased to 60 and after 22 hours the foam volume was 68.

In a manner similar to the foregoing examples, other re-expandable particles are readily prepared utilizing polyvinylchloride, polyethylene, polypropylene, polymethyl methacrylate, copolymers of 10 percent methyl methacrylate and 90 percent styrene, copolymers of 10 percent vinyl acetate and 90 percent vinyl chloride.

EXAMPLE 13

A corrugated board carton measuring approximately 6 x 6 x 6 inches is filled to a depth of about one inch with collapsed particles as are obtained from the procedure utilized for sample 3 of Example 4. A 60 watt light bulb was placed over the particles and a sufficient quantity of particles were placed in the carton to extend about 2 inches from the bottom and a number of particles were placed on the light bulb. The carton was closed and sealed with tape. After 24 hours, checking the carton indicated that the particles had expanded to retain the light bulb and prevent any movement thereof. On opening the carton the light bulb was found to be positioned generally centrally within the carton and the remainder of the space was filled with expanded particles which had conformed to each other and substantially eliminated interstitial spaces. No tendency was observed for the foam particles to adhere to the glass envelope of the light bulb or to the metal base.

In a manner similar to the foregoing example, articles such as meters, measuring instruments, electronic tubes or valves are conveniently and easily packaged employing any of the hereinbefore delineated particles without any tendency for the particles to adhere to or contaminate solid surfaces.

As is apparent from the foregoing specification, the method and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing an expandable cellular thermoplastic resinous body, the body being capable of expansion in air at atmospheric pressure at a temperature within the range of from about 5° C. to 35° C., the steps of the method comprising subjecting an expandable thermoplastic resinous body containing a volatile expanding agent to a temperature sufficiently high to heat plastify the resinous body and cause it to expand by forming a plurality of individually closed cells therein subjecting the cellular body at heat plastifying temperature to a pressure of from about 0.001 to about 5 pounds per square inch absolute until the body has expanded to a density of less than about one pound per cubic foot, cooling the body below the heat plastifying temperature under a pressure of from about 0.001 to about 5 pounds per square inch absolute while retaining within the individual closed cells of the body at least a portion of the volatile blowing agent, subjecting the body to a gas pressure of about ambient atmospheric pressure, thereby collapsing it to a volume of less than about 35 percent of the maximum volume attained during the expansion, thereby providing partially collapsed cellular particles stable at ambient temperatures in the absence of a gas that permeates the cell walls into the cell.

2. The method of claim 1 wherein the heating and expansion of the body is carried out at a pressure of from about 0.05 to about 1 pound per square inch absolute.

3. The method of claim 2 wherein the thermoplastic esinous body comprises a chlorostyrene polymer.

4. The method of claim 1, including the step of subsequently maintaining the collapsed particles in an atmosphere which has a diffusion into the cells about equal to the diffusion of the atmosphere within the cells out of the cells.

5. The method of claim 1 including the step of placing the body in a container having a volume about equal to the volume of the body and mechanically restraining the body from expanding to a volume greater than that of the container.

6. The method of claim 5 including the step of subsequently removing the body from the container, exposing the body to air at a temperature between about 5° C. and 35° C., thereby causing the body to re-expand.

7. The method of claim 1 wherein the body is a mass of particles.

References Cited

UNITED STATES PATENTS 3,344,221  9/1967  Moody et al. _____ 260—2.5
3,259,594  7/1966  Wright.

MURRAY TILLMAN, Primary Examiner

W. J. BRIGGS SR., Assistant Examiner

U.S. Cl. X.R.

260—33.6, 33.8, 85.5, 86.7, 87.1, 89.5, 91.5, 93.5, 94.9